(12) United States Patent
Kim et al.

(10) Patent No.: US 8,765,896 B2
(45) Date of Patent: Jul. 1, 2014

(54) ACRYLIC COPOLYMER WITH HIGH HEAT RESISTANCE AND HIGH STRENGTH, AND OPTICAL FILM COMPRISING THE SAME

(75) Inventors: Su-Kyung Kim, Daejeon (KR); Da-Eun Sung, Daejeon (KR); Chang-Hun Han, Daejeon (KR); Byung-Il Kang, Daejeon (KR); Jae-Bum Seo, Daejeon (KR); Eun-Jung Choi, Daejeon (KR); Byoung-Kue Chun, Daejeon (KR); Yu-Taek Sung, Daejeon (KR)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 13/702,911

(22) PCT Filed: Jun. 8, 2011

(86) PCT No.: PCT/KR2011/004212
§ 371 (c)(1),
(2), (4) Date: Feb. 19, 2013

(87) PCT Pub. No.: WO2011/155771
PCT Pub. Date: Dec. 15, 2011

(65) Prior Publication Data
US 2013/0144023 A1    Jun. 6, 2013

(30) Foreign Application Priority Data
Jun. 8, 2010   (KR) .................. 10-2010-0053980

(51) Int. Cl.
*C08F 220/10*   (2006.01)
*C08F 8/00*   (2006.01)
*C08L 69/00*   (2006.01)
*C08L 27/06*   (2006.01)

(52) U.S. Cl.
USPC ..... 526/307.3; 526/308; 526/319; 526/329.2; 526/340; 525/55; 525/148; 525/205; 525/216; 525/227; 252/585

(58) Field of Classification Search
USPC .................. 526/307.7, 308, 319, 340, 329.2; 525/55, 148, 205, 216, 227, 228; 252/585
See application file for complete search history.

(56) References Cited

U.S. PATENT DOCUMENTS

| | | | |
|---|---|---|---|
| 532,479 A | 1/1895 | Pathe et al. | |
| 5,324,793 A * | 6/1994 | Brehm et al. | 525/384 |
| 2010/0297368 A1 | 11/2010 | Park et al. | |
| 2011/0211144 A1 | 9/2011 | Chun et al. | |
| 2011/0263806 A1 | 10/2011 | Dietrich et al. | |

FOREIGN PATENT DOCUMENTS

| | | |
|---|---|---|
| CN | 101679826 A | 3/2010 |
| JP | 5-306344 A | 11/1993 |
| JP | 6-1903 A | 1/1994 |
| JP | 6-108025 A | 4/1994 |
| JP | 2009-222743 | 1/2009 |
| JP | 2009-80177 A | 4/2009 |
| JP | 2009-235249 A | 10/2009 |
| JP | 2009-293021 | 12/2009 |
| JP | 2009-293021 A | 12/2009 |
| JP | 2009293021 A * | 12/2009 |
| JP | 2012-508803 A | 4/2012 |
| KR | 1020080069355 | 7/2008 |
| WO | 98/55885 A1 | 12/1998 |
| WO | 2010/062133 A2 | 6/2010 |

* cited by examiner

*Primary Examiner* — Michael M Bernshteyn
(74) *Attorney, Agent, or Firm* — McKenna Long & Aldridge, LLP

(57) ABSTRACT

The present invention relates to an acrylic copolymer having high heat resistance and high strength, and an optical film comprising the same, and more particularly, to an acrylic copolymer for optical films in which alkyl (meth)acrylate monomers; (meth)acrylate monomers comprising aromatic rings and/or aliphatic rings; and (meth)acrylamide monomers are included and polymerized. An acrylic copolymer according to the present invention is excellent in heat resistance while maintaining transparency. Further, an optical film comprising a compound resin including the acrylic copolymer has superior transparency and heat resistance and is excellent in formability, adhesion, retardation properties, and durability.

18 Claims, No Drawings

ACRYLIC COPOLYMER WITH HIGH HEAT RESISTANCE AND HIGH STRENGTH, AND OPTICAL FILM COMPRISING THE SAME

This application is a National Stage Entry of International Application No. PCT/KR2011/004212, filed Jun. 8, 2011, and claims the benefit of Korean Application No. 10-2010-0053980, filed on Jun. 8, 2010, which are hereby incorporated by reference in its entirety for all purposes as if fully set forth herein.

TECHNICAL FIELD

The present invention relates to an acrylic copolymer having high heat resistance and high strength, and an optical film comprising the same.

BACKGROUND ART

In general, with the development of recent optical technologies as their springboards, display technologies using various processes are being suggested and commercialized and Plasma Display Panels (PDPs) and Liquid Crystal Displays (LCDs) are replacing the cathode-ray tubes of the related art. Required characteristics of polymer materials for these displays are being further advanced. For example, particularly important issues in the case of LCDs have been wide viewing angles, high contrast ratios, uniformity of screen displays and the inhibition of image color variations according to viewing angles as reductions in thickness and weight as well as the enlargement of LCD screens are being pushed ahead.

Accordingly, a diversity of polymer films such as polarizing films, polarizer protection films, retardation films, plastic substrates, and light guide plates have been used, and LCD devices of various modes using twisted nematic (TN), super Twisted nematic (STN), vertical alignment (VA), and in-plane switching (IPS) liquid crystal cells have been developed as liquid crystals have also been developed. All of these liquid crystal cells have intrinsic optical anisotropy properties due to their intrinsic liquid crystal alignments, and films to which retardation functions have been given by stretching various types of polymer films have been suggested to compensate the optical anisotropic properties.

Specifically, since high birefringence characteristics and orientations possessed by liquid crystal molecules are used in LCD devices, refractive indexes of LCD devices are varied according to viewing angles thereof, and the color and brightness of the screens of LCD devices vary accordingly. For instance, since most of the liquid crystal molecules have positive retardations in the thickness direction of the liquid crystal display surface, compensation films having negative retardations in the thickness direction of the liquid crystal display surface are needed to compensate for the positive retardations. Further, although light cannot pass through two polarizers crossing at right angles to each other, a light-leakage phenomenon may occur, since optical axes of the two polarizers do not cross at right angles to each other if the two polarizers are tilted. Therefore, a compensation film having a surface directional retardation is needed to compensate the light-leakage phenomenon. Additionally, display devices using liquid crystals need to have a surface directional retardation as well as a thickness directional retardation compensated in order to enlarge the viewing angle.

It is necessary that the birefringence of retardation compensation films should be easily controlled. However, the birefringence of films not only includes a fundamental birefringence of a material itself, but is also formed by the orientation of polymer chains in the films. The orientation of polymer chains is mostly occurs coercively due to force applied from the outside or is caused by intrinsic characteristics possessed by the material, and a method for molecular orientation through external force comprises stretching a polymer film uniaxially or biaxially.

In order to solve LCD viewing angle problems due to the foregoing intrinsic birefringence properties of liquid crystals, N-TAC, V-TAC, and COP films have recently been used as compensation films or retardation films. However, such films have disadvantages in being relatively expensive and having complicated preparation processes.

DISCLOSURE

Technical Problem

An aspect of the present invention provides an acrylic copolymer resin which maintains transparency and has excellent heat resistance as compared to acrylic copolymer resins of the related art.

Another aspect of the present invention provides a resin composition for optical films comprising the acrylic copolymer resin and resins having aromatic rings and/or aliphatic rings included in main chains thereof.

Another aspect of the present invention provides an optical film excellent in heat resistance and optical transparency comprising the resin composition for optical films, and a liquid crystal display device comprising the optical film.

Technical Solution

According to an aspect of the present invention, there is provided an acrylic copolymer for optical films in which alkyl (meth)acrylate monomers; (meth)acrylate monomers comprising aromatic rings and/or aliphatic rings; and (meth)acrylamide monomers are included and polymerized.

According to another aspect of the present invention, there is provided a compound resin in which the acrylic copolymer for optical films is mixed with resins having aromatic rings and/or aliphatic rings included in main chains thereof.

According to another aspect of the present invention, there is provided an optical film comprising the compound resin.

Advantageous Effects

An acrylic copolymer for optical films according to the present invention is excellent in heat resistance while maintaining transparency. Further, an optical film comprising a compound resin including the acrylic copolymer for optical films has superior transparency and heat resistance and is excellent in formability, adhesion, retardation properties, and durability.

BEST MODE

Exemplary embodiments of the present invention will now be described in detail with reference to the accompanying drawings.

A first aspect of the present invention relates to an acrylic copolymer for optical films in which alkyl (meth)acrylate monomers; (meth)acrylate monomers comprising aromatic rings and/or aliphatic rings; and (meth)acrylamide monomers are included and polymerized.

A copolymer resin comprising monomers in the present specification means a copolymer resin in which monomers are polymerized and included in the copolymer resin as a repeating unit.

In addition, as used herein, the term "(meth)acrylate monomers" includes "acrylate monomers" and "methacrylate monomers".

In addition, as used herein, the term "(meth)acrylamide monomers" includes "acrylamide monomers" and "methacrylamide monomers".

The acrylic copolymer may be a block copolymer or a random copolymer, but forms of the copolymer are not limited thereto.

In the acrylic copolymer resin for optical films, the alkyl (meth)acrylate monomers mean both alkyl acrylate monomers and alkyl methacrylate monomers. The alkyl (meth)acrylate monomers preferably have alkyl groups with 1 to carbon atoms, more preferably alkyl groups with 1 to 4 carbon atoms, and furthermore, preferably have methyl or ethyl groups. Although the alkyl methacrylate monomers are more preferably methyl methacrylate monomers, the alkyl methacrylate monomers are not limited thereto.

In the acrylic copolymer resin, the content of alkyl methacrylate monomers is preferably 50 to 98.9% by weight, and more preferably, 50 to 90% by weight. If the content of alkyl methacrylate monomers is within the foregoing range, the acrylic copolymer resin is capable of maintaining heat resistance as well as having superior transparency.

In the acrylic copolymer resin, (meth)acrylate monomers comprising aromatic rings and/or aliphatic rings may play a role in increasing compatibility with resins having aromatic rings and/or aliphatic rings included in main chains thereof. For instance, the (meth)acrylate monomers may be cycloalkyl (meth)acrylate monomers or aryl (meth)acrylate monomers.

The cycloalkyl (meth)acrylate monomers may preferably have a cycloalkyl group with 4 to 12 carbon atoms, more preferably, a cycloalkyl group with 5 to 8 carbon atoms, and most preferably a cyclohexyl group. Further, the aryl (meth)acrylate monomers may preferably have an aryl group with 6 to 12 carbon atoms, most preferably a phenyl group.

Specific examples of the (meth)acrylate monomers comprising aromatic rings and/or aliphatic rings may include cyclopentyl methacrylate, cyclohexyl methacrylate, benzyl methacrylate, cyclohexyl acrylate, 2-phenoxyethyl acrylate, 3,3,5-trimethylcyclohexyl methacrylate, 4-t-butylcyclohexyl methacrylate, 3-cyclohexylpropyl methacrylate, phenyl methacrylate, 4-t-butylphenyl methacrylate, 4-methoxyphenyl methacrylate, 1-phenylethyl methacrylate, 2-phenylethyl acrylate, 2-phenylethyl methacrylate, 2-phenoxyethyl methacrylate, and 2-naphthyl methacrylate, and preferably include cyclohexyl methacrylate or phenyl methacrylate. However, the (meth)acrylate monomers are not limited thereto.

In the acrylic copolymer resin, the content of the (meth) acrylate monomers comprising aromatic rings and/or aliphatic rings is preferably more than 0% by weight to less than 50% by weight, and more preferably, more than 0% by weight to not more than 30% by weight. Heat resistance can be sufficiently secured if the content of the (meth)acrylate monomers comprising aromatic rings and/or aliphatic rings is within the foregoing range.

In the acrylic copolymer resin, the (meth)acrylamide monomers play a role in enabling a copolymer of the present invention to exhibit higher heat resistance and strength. Although examples of the (meth)acrylamide monomers may include N-substituted methacrylamide, and methacrylamide including aromatic rings and/or aliphatic rings, the (meth) acrylamide monomers are not limited thereto. Examples of substituents of the N-substituted methacrylamide may include ethyl, isopropyl, tert-butyl, cyclohexyl, benzyl, and phenyl groups. However, the substituents of the N-substituted methacrylamide are not limited thereto.

The methacrylamide is preferably included in an amount range of 0.1 to 10% by weight.

Further, it is preferable that the acrylic copolymer resin has a weight average molecular weight of 50,000 to 500,000 considering the aspects of heat resistance, formability, and productivity.

The acrylic copolymer resin may preferably have a glass transition temperature (Tg) of not less than 120° C., and more preferably, not less than 130° C. Although a glass transition temperature of the acrylic copolymer resin is not particularly limited, it may be 200° C. or less.

A second aspect of the present invention relates to a compound resin in which the acrylic copolymer of the first aspect of the present invention is mixed with resins having aromatic rings and/or aliphatic rings included in main chains thereof.

In the resin composition, examples of the resins having aromatic rings and/or aliphatic rings included in main chains thereof may include polycarbonate resin, polyarylate resin, polynaphthalene resin, and polynorbornene resin. Although it is more preferable that the resins having aromatic rings and/or aliphatic rings included in main chains thereof are polycarbonate resin, the resins having aromatic rings and/or aliphatic rings included in main chains thereof are not limited thereto.

The resin composition may preferably comprise 60 to 99.9% by weight of an acrylic copolymer resin and 0.1 to 40% by weight of resin having aromatic rings and/or aliphatic rings included in main chains thereof, and more preferably 70 to 99% by weight of the acrylic copolymer resin and 1 to 30% by weight of the resin having aromatic rings and/or aliphatic rings included in main chains thereof.

The resin composition may be prepared by blending the acrylic copolymer resin with the resin having aromatic rings and/or aliphatic rings included in main chains thereof by processes well-known to those skilled in the art such as compounding process, and the resin composition may comprise 0.001 to 70 parts by weight of additives well-known to those skilled in the art such as a coloring agent, a flame retardant, a reinforcement, a filler, a UV stabilizer, and an antioxidant.

The resin composition may preferably have a glass transition temperature of not less than 110° C., and more preferably, not less than 120° C. Although a glass transition temperature of the resin composition is not particularly limited, it may be 200° C. or less.

Further, it is preferable that the resin composition has a weight average molecular weight of 50,000 to 500,000 considering the aspects of heat resistance, sufficient formability, and productivity.

A third aspect of the present invention relates to an optical film comprising the compound resin.

An optical film according to the present invention may have a different retardation value according to the content of resin having aromatic rings and/or aliphatic rings included in main chains thereof, and the optical film may be used as a retardation compensation film or a protection film accordingly.

Depending on the retardation value, a VA (Vertical Alignment) type retardation compensation film or a TN (Twisted Nematic) type retardation compensation film can be used as the retardation compensation film. An optical film according to the present invention may have a surface directional retardation value ($R_{in}$) of 30 nm to 80 nm and a thickness directional retardation value ($R_{th}$) of −50 nm to −300 nm, wherein the optical film according to the present invention may be used as the VA type retardation compensation film. Further, an optical film according to the present invention may have a surface directional retardation value ($R_{in}$) of 150 nm to 200 nm and a thickness directional retardation value ($R_{th}$) of −90 nm or less, i.e., not less than an absolute value 90 of the thickness directional retardation value, wherein the optical film according to the present invention may be used as the TN type retardation compensation film. If the optical film is used as the TN type retardation compensation film, the thickness directional retardation value ($R_{th}$) is more preferably −90 nm to −150 nm.

In an embodiment of the present invention, if the content of the resin having aromatic rings and/or aliphatic rings included in main chains thereof is 10 to 40% by weight, the optical film may have a surface directional retardation value ($R_{in}$) of 30 nm to 80 nm and a thickness directional retardation value ($R_{th}$) of −50 nm to −300 nm, wherein the optical film according to the present invention may be used as the VA type retardation compensation film.

In another embodiment of the present invention, if the content of the resin having aromatic rings and/or aliphatic rings included in main chains thereof is 0.1 to 10% by weight, more preferably 1 to 5% by weight, the optical film may have a surface directional retardation value ($R_{in}$) of 0 nm to 10 nm, preferably 0 nm to 5 nm, and more preferably about 0 nm, and a thickness directional retardation value ($R_{th}$) of −10 nm to 10 nm, preferably −5 nm to 5 nm, and more preferably about 0 nm, wherein the optical film according to the present invention may be used as a polarizer protection film.

A film preparation method comprises a step of preparing the optical film from the resin composition by processes well-known to those skilled in the art such as a solution caster process and an extrusion process, wherein the solution caster process is preferable among the processes.

The film preparation method further comprises a step of stretching the prepared film uniaxially or biaxially, and may comprise a step of adding a conditioner to prepare the optical film if it is necessary.

If the film is stretched uniaxially or biaxially, the stretching process may comprise performing a machine directional (MD) stretching operation, a transverse direction (TD) stretching operation, or both machine directional (MD) and transverse direction (TD) stretching operations. If the film is stretched in both a machine direction and a transverse direction, the other side of the film may be stretched after first stretching one side of the film, or both sides of the film may be stretched at the same time. The film may be stretched in a single step or over multiple steps. The film may be stretched by a velocity difference between rolls if the film is stretched in the machine direction, and the film may be stretched using a tenter if the film is stretched in the traverse direction. Rail opening angles of the tenter amount to within 10 degrees of an angle to suppress a bowing phenomenon from occurring during the transverse directional stretching operation and regularly control angles of optical axes. The bowing suppressing effect may be obtained by performing the transverse directional stretching operation in multiple steps.

When a glass transition temperature of the resin composition is Tg, the stretching may be performed at a temperature ranging from (Tg−20° C.)~(Tg+30° C.). The glass transition temperature refers to a temperature range starting from a temperature at which a storage modulus of the resin composition starts to be lowered so a loss modulus starts to be increased to be greater than the storage modulus to a temperature at which orientation of polymer chains is lessened to be lost. The glass transition temperature may be measured by a DSC (Differential Scanning calorimeter). Temperature measured during the stretching process is more preferably a glass transition temperature of the film.

It is preferable to perform the stretching operation in a stretching speed range of 1 to 100 mm/min in a case of a small stretching machine (Universal testing machine, Zwick Z010) and perform the stretching operation in a stretching speed range of 0.1 to 2 m/min in a case of pilot stretching equipment. The film is preferably stretched to an elongation ratio of 5 to 300%.

An optical film according to the present invention is stretched uniaxially or biaxially by the above-mentioned method such that retardation properties of the optical film may be controlled.

The foregoing prepared optical film may preferably have a surface directional retardation value of 0 nm to 200 nm represented by the following Mathematical Formula 1 and a thickness directional retardation value of 10 nm to −300 nm represented by the following Mathematical Formula 2.

$$R_{in}=(n_x-n_y)\times d \quad \text{[Mathematical Formula 1]}$$

$$R_{th}=(n_z-n_y)\times d \quad \text{[Mathematical Formula 2]}$$

In the Mathematical Formulas 1 and 2, $n_x$ is a refractive index of a direction at which the refractive index is the greatest in the surface direction of the film, $n_y$ is a refractive index of a direction perpendicular to the $n_x$ direction in the surface direction of the film, nz is a thickness directional refractive index, and d is thickness of the film.

In an optical film according to the present invention, the surface directional retardation value and thickness directional retardation value may be controlled according to the content of the resin having aromatic rings and/or aliphatic rings included in main chains thereof. For instance, an optical film according to the present invention may have a surface directional retardation value ($R_{in}$) of 20 nm to 80 nm and a thickness directional retardation value ($R_{th}$) of −50 nm to −300 nm, wherein the optical film according to the present invention may be used as the VA type retardation compensation film. Further, an optical film according to the present invention may have a surface directional retardation value ($R_{in}$) of 0 nm to 10 nm, preferably 0 nm to 5 nm, and more preferably about 0 nm, and a thickness directional retardation value ($R_{th}$) of −10 nm to 10 nm, preferably −5 nm to 5 nm, and more preferably about 0 nm, wherein the optical film according to the present invention may be used as a polarizer protection film.

If an optical film according to the present invention is applied to a liquid crystal display device in a manner in which the optical film is equipped at one side or both sides of a liquid crystal display panel, the optical film is a one-sheet type optical film or two-sheet type optical film.

If an optical film according to the present invention is provided on only one side of the liquid crystal display panel, the optical film may have a surface directional retardation value ($R_{in}$) of 30 nm to 80 nm, preferably 35 nm to 70 nm, and more preferably about 40 nm to 60 nm, and preferably a thickness directional retardation value ($R_{th}$) of −270 nm or less, i.e., not less than an absolute value 270 of the thickness directional retardation value.

If an optical film according to the present invention is provided on both sides of the liquid crystal display panel respectively, the optical film may have a surface directional retardation value ($R_{in}$) of 30 nm to 80 nm, preferably 35 nm to 70 nm, more preferably about 40 nm to 60 nm, and preferably a thickness directional retardation value ($R_{th}$) of −100 nm or less, i.e., not less than an absolute value 100 of the thickness directional retardation value.

A brittleness of an optical film according to the present invention may be measured by dropping a steel ball having a diameter of 15.9 mm and a weight of 16.3 g onto a test film and measuring the dropping height of the steel ball at which the steel ball forms a hole in the test film. In the optical film of the present invention, the height may preferably be 600 mm or more, and more preferably 700 mm or more.

An optical film according to the present invention may preferably have a haze value of 1% or less, more preferably 0.5% or less, and most preferably 0.1% or less.

Hereinafter, the present invention will be described in more detail with reference to the following examples and comparative examples. However, the following examples and comparative examples are provided for illustrative purposes only, and the scope of the present invention should not be seen as being limited thereto in any manner.

MODE FOR INVENTION

EXAMPLES

Methods of evaluating physical properties in examples of the present invention are described as follows.

Weight average molecular weight (Mw): A weight average molecular weight value of the resin was measured using Gel Permeation Chromatography (GPC) after dissolving prepared resin into tetrahydrofuran.

Tg (Glass transition temperature): A glass transition temperature value was measured using a DSC (Differential Scanning calorimeter) manufactured by TA Instruments, Inc.

Retardation values ($R_{in}$/$R_{th}$): Retardation values of the film were measured using an AxoScan manufactured by Axometrics Co., Ltd. after stretching the film at the glass transition temperature.

Haze value (transparency): A haze value was measured using HAZEMETER HM-150 manufactured by Murakami Color Research Laboratory Co., Ltd.

Example 1

An acrylic copolymer resin was prepared from 89 parts by weight of methyl methacrylate, 10 parts by weight of phenyl methacrylate, and 1 part by weight of methacrylamide. As results of measurements for a glass transition temperature and a molecular weight of the prepared resin, a resin with a glass transition temperature of 130° C. and a molecular weight of 110,000 could be obtained. 99 parts by weight of the resin was compounded with 1 part by weight of polycarbonate to prepare a final resin composition. After preparing a film from the resin composition by a solution casting process, the film was stretched at the glass transition temperature, and retardation values of the stretched film were measured. As results of the measurements for the retardation values, a surface retardation value/a thickness directional retardation value of the film was 1.5/−0.5.

Example 2

An acrylic copolymer resin was prepared from 87 parts by weight of methyl methacrylate, 10 parts by weight of phenyl methacrylate, and 3 parts by weight of methacrylamide. As results of measurements for a glass transition temperature and a molecular weight of the prepared resin, a resin with a glass transition temperature of 132° C. and a molecular weight of 105,000 could be obtained. 98.5 parts by weight of the resin was compounded with 1.5 parts by weight of polycarbonate to prepare a final resin composition. After preparing a film from the resin composition by a solution casting process, the film was stretched at the glass transition temperature, and retardation values of the stretched film were measured. As results of the measurements for the retardation values, a surface retardation value/a thickness directional retardation value of the film was 0.9/−0.7.

Example 3

An acrylic copolymer resin was prepared from 90 parts by weight of methyl methacrylate, 5 parts by weight of phenyl methacrylate, and 5 parts by weight of methacrylamide. As results of measurements for a glass transition temperature and a molecular weight of the prepared resin, a resin with a glass transition temperature of 135° C. and a molecular weight of 120,000 could be obtained. 99.2 parts by weight of the resin was compounded with 0.8 part by weight of polycarbonate to prepare a final compound resin. After preparing a film from the compound resin by a solution casting process, the film was stretched at the glass transition temperature, and retardation values of the stretched film were measured. As results of the measurements for the retardation values, a surface retardation value/a thickness directional retardation value of the film was 0.3/−0.9.

Examples 4 to 12

Acrylic copolymer resins comprising methyl methacrylate, (meth)acrylate monomers having aromatic rings included therein, and methacrylamide were prepared by the same methods as those of examples 1 to 3 except that contents of methyl methacrylate, (meth)acrylate monomers having aromatic rings included therein, and methacrylamide used in each of the examples 4 to 12 were as represented as in the following table 1, and glass transition temperature values and weight average molecular weight values of the obtained acrylic copolymer resins were also as represented in the following table 2.

After mixing the obtained acrylic copolymer resins with polycarbonate at ratios as represented as in the following table 3 to obtain compound resins and preparing films from the compound resins by the solution casting process, the films were stretched at the glass transition temperature values, and retardation values of the stretched films were measured. The measurement results were as represented as in the following table 4.

Comparative Example 1

An acrylic copolymer resin was prepared from 90 parts by weight of methyl methacrylate and 10 parts by weight of phenyl methacrylate. As results of measurements for a glass transition temperature and a molecular weight of the prepared resin, a resin with a glass transition temperature of 124° C. and a molecular weight of 100,000 could be obtained. The resin was mixed with polycarbonate at a weight ratio of 90:10 and the mixture was compounded to prepare a final compound resin. After preparing a film from the compound resin by the solution casting process, the film was stretched at the glass transition temperature, and retardation values of the stretched film were measured. As results of the measurements for the retardation values, a surface retardation value/a thickness directional retardation value of the film was 1.4/−0.7.

Comparative Example 2

An acrylic copolymer resin was prepared from 80 parts by weight of methyl methacrylate and 20 parts by weight of phenyl methacrylate. As results of measurements for a glass transition temperature and a molecular weight of the prepared resin, a resin with a glass transition temperature of 119° C. and a molecular weight of 90,000 could be obtained. The resin was mixed with polycarbonate at a weight ratio of 90:10 and the mixture was compounded to prepare a final compound resin. After preparing a film from the compound resin by the solution casting process, the film was stretched at the glass transition temperature, and retardation values of the stretched film were measured. As results of the measurements for the retardation values, a surface retardation value/a thickness directional retardation value of the film was 48/−105.

TABLE 1

| | Content ratio (weight ratio) | | |
|---|---|---|---|
| | MMA | (Meth) acrylate monomers including aromatic rings | MAAM |
| Example 1 | 89 | PhMA 10 | 1 |
| Example 2 | 87 | PhMA 10 | 3 |
| Example 3 | 90 | PhMA 5 | 5 |
| Example 4 | 78 | PhMA 15 | 7 |
| Example 5 | 80 | ChMA 15 | 5 |
| Example 6 | 78 | B$_2$MA 15 | 7 |
| Example 7 | 87 | PhMA 10 | 3 |
| Example 8 | 75 | PhMA 20 | 5 |
| Example 9 | 83 | PhMA 10 | 7 |
| Example 10 | 87 | PhMA 10 | 3 |
| Example 11 | 75 | PhMA 20 | 5 |
| Example 12 | 82 | ChMA 10 | 8 |
| Comparative Example 1 | 90 | PhMA 10 | — |
| Comparative Example 2 | 80 | ChMA 10 | — |

MMA: methyl methacrylate
ChMa: cyclohexyl methacrylate
B2MA: benzyl methacrylate

TABLE 2

| | Glass transition temperature (Tg) | Weight average molecular weight (Mw) |
|---|---|---|
| Example 1 | 130 | 110,000 |
| Example 2 | 132 | 105,000 |
| Example 3 | 135 | 120,000 |
| Example 4 | 137 | 95,000 |
| Example 5 | 135 | 10,000 |
| Example 6 | 133 | 98,000 |
| Example 7 | 133 | 111,000 |
| Example 8 | 135 | 95,000 |
| Example 9 | 138 | 105,000 |
| Example 10 | 132 | 111,000 |
| Example 11 | 135 | 98,000 |
| Example 12 | 137 | 106,000 |
| Comparative Example 1 | 124 | 100,000 |
| Comparative Example 2 | 119 | 90,000 |

TABLE 3

| | Content ratio (weight ratio) | | Miscibility of |
|---|---|---|---|
| | Acrylic copolymer | Polycarbonate | acrylic copolymer and polycarbonate |
| Example 1 | 99 | 1 | Good |
| Example 2 | 98.5 | 1.5 | Good |
| Example 3 | 99.2 | 0.8 | Good |
| Example 4 | 98 | 2 | Good |
| Example 5 | 98.5 | 1.5 | Good |
| Example 6 | 99 | 1 | Good |
| Example 7 | 80 | 20 | Good |
| Example 8 | 75 | 25 | Good |
| Example 9 | 80 | 20 | Good |
| Example 10 | 90 | 10 | Good |
| Example 11 | 88 | 12 | Good |
| Example 12 | 88 | 12 | Good |
| Comparative Example 1 | 99 | 1 | Good |
| Comparative Example 2 | 90 | 10 | Good |

TABLE 4

| | $B_{iL}$ | $B_{rh}$ | Photoelastic coefficient |
|---|---|---|---|
| Example 1 | 1.5 | −0.5 | 0.9 |
| Example 2 | 0.9 | −0.7 | 0.6 |
| Example 3 | 0.3 | −0.9 | 0.5 |
| Example 4 | 1.5 | −2.0 | 1.0 |
| Example 5 | 1.0 | −0.9 | 0.7 |
| Example 6 | 0.4 | −0.8 | 0.5 |
| Example 7 | 56 | −275 | 5.5 |
| Example 8 | 65 | −296 | 6.0 |
| Example 9 | 60 | −263 | 5.2 |
| Example 10 | 42 | −120 | 3.8 |
| Example 11 | 47 | −121 | 4.2 |
| Example 12 | 50 | −123 | 4.1 |
| Comparative Example 1 | 1.4 | −0.9 | 0.7 |
| Comparative Example 2 | 48 | −105 | 4.1 |

[Drop Ball Test]—Strength Evaluation

Drop ball tests were performed to measure strength values of films that were prepared in examples 1 to 3 and comparative example 1. The drop ball tests were performed by dropping steel balls with a diameter of 15.9 mm and a weight of 16.3 g onto films and measuring dropping heights of the steel balls at which the steel balls formed holes in the films. As results of the measurement, the measured height values were represented in the following table 5.

TABLE 5

| | Example 1 | Example 2 | Example 3 | Comparative Example 1 |
|---|---|---|---|---|
| Heights (mm) at which holes were formed in the films | 780 | 801 | 820 | 620 |

As represented in the foregoing table 2, it could be confirmed that an acrylic copolymer of the present invention had superior heat resistance due to glass transition temperature values of the examples being higher than those of the comparative examples.

Further, as represented in the foregoing table 5, it could be confirmed that strength values of final optical films in the examples were also more excellent than that of the comparative example.

While the present invention has been shown and described in connection with the exemplary embodiments, it will be apparent to those skilled in the art that modifications and variations can be made without departing from the spirit and scope of the invention as defined by the appended claims.

The invention claimed is:

1. An acrylic copolymer for optical films, polymerized by comprising:
   1) 50 to 98.9% by weight of alkyl (meth)acrylate monomers;
   2) 1 to 49.9% by weight of cycloalkyl (meth)acrylate monomers or aryl (meth)acrylate monomers; and
   3) 0.1 to 10% by weight of (meth)acrylamide monomers.

2. The acrylic copolymer for optical films of claim 1, wherein the alkyl (meth)acrylate monomers have alkyl groups with 1 to 10 carbon atoms.

3. The acrylic copolymer for optical films of claim 1, wherein the alkyl (meth)acrylate monomers are methyl (meth)acrylate monomers.

4. The acrylic copolymer for optical films of claim 1, wherein the cycloalkyl (meth)acrylate monomers have a cycloalkyl group with 4 to 12 carbon atoms, and the aryl (meth)acrylate monomers have an aryl group with 6 to 12 carbon atoms.

5. The acrylic copolymer for optical films of claim 1, wherein the cycloalkyl (meth)acrylate monomers or aryl (meth)acrylate monomers are one or more selected from the group consisting of cyclopentyl methacrylate, cyclohexyl methacrylate, benzyl methacrylate, cyclohexyl acrylate, 3,3,5-trimethylcyclohexyl methacrylate, 4-t-butylcyclohexyl methacrylate, phenyl methacrylate, 4-t-butylphenyl methacrylate, 4-methoxyphenyl methacrylate, and 2-naphthyl methacrylate.

6. The acrylic copolymer for optical films of claim 1, wherein the (meth)acrylamide monomers are N-substituted methacrylamide, or methacrylamide including aromatic rings and/or aliphatic rings, and substituents of the N-substituted methacrylamide are one selected from the group consisting of ethyl, isopropyl, tert-butyl, cyclohexyl, benzyl, and phenyl groups.

7. The acrylic copolymer for optical films of claim 1, wherein the acrylic copolymer has a glass transition temperature (Tg) of not less than 120° C.

8. The acrylic copolymer for optical films of claim 1, wherein the acrylic copolymer has a weight average molecular weight of 50,000 to 500,000.

9. A compound resin in which an acrylic copolymer for optical films of claim 1 is mixed with resins having aromatic rings and/or aliphatic rings included in main chains thereof.

10. The compound resin of claim 9, wherein the resins having aromatic rings and/or aliphatic rings included in main chains thereof are polycarbonate resins.

11. The compound resin of claim 10, comprising 60 to 99.9% by weight of the acrylic copolymer for optical films and 0.1 to 40% by weight of polycarbonate resin.

12. An optical film comprising the compound resin of claim 9.

13. The optical film of claim 12, wherein the optical film is a retardation compensation film or a protection film.

14. The optical film of claim 13, wherein the retardation compensation film is a retardation compensation film for a VA (Vertical Alignment) mode liquid crystal display device or a retardation compensation film for a TN (Twisted Nematic) mode liquid crystal display device.

15. The optical film of claim 12, wherein the optical film has a surface directional retardation value $R_{in}$ of −5 nm to 200 nm represented by the following Mathematical Formula 1:

$$R_{in}=(n_x-n_y) \times d \qquad \text{[Mathematical Formula 1]}$$

where $n_x$ is a refractive index of a direction in which the refractive index is the greatest in the surface direction of the film, $n_y$ is a refractive index of a direction perpendicular to the $n_x$ direction in the surface direction of the film, and d is thickness of the film.

16. The optical film of claim 12, wherein the optical film has a thickness directional retardation value $R_{th}$ of 5 nm to −300 nm represented by the following Mathematical Formula 2:

$$R_{th}=(n_z-n_y) \times d \qquad \text{[Mathematical Formula 2]}$$

where $n_x$ is a refractive index of a direction at which the refractive index is the greatest in the surface direction of the film, $n_y$ is a refractive index of a direction perpendicular to the $n_x$ direction in the surface direction of the film, $n_z$ is a thickness directional refractive index, and d is thickness of the film.

17. The optical film of claim 12, wherein the optical film has a surface directional retardation value $R_{in}$ of 20 nm to 80 nm represented by the following Mathematical Formula 1 and a thickness directional retardation value $R_{th}$ of −50 nm to −300 nm represented by the following Mathematical Formula 2:

$$R_{in}=(n_x-n_y) \times d \qquad \text{[Mathematical Formula 1]}$$

$$R_{th}=(n_z-n_y) \times d \qquad \text{[Mathematical Formula 2]}$$

where $n_x$ is a refractive index of a direction at which the refractive index is the greatest in the surface direction of the film, $n_y$ is a refractive index of a direction perpendicular to the $n_x$ direction in the surface direction of the film, $n_z$ is a thickness directional refractive index, and d is thickness of the film.

18. The optical film of claim 12, wherein the optical film has a surface directional retardation value $R_{in}$ of 0 nm to 10 nm represented by the following Mathematical Formula 1 and a thickness directional retardation value $R_{th}$ of −10 nm to 10 nm represented by the following Mathematical Formula 2.

$$R_{in}=(n_x-n_y) \times d \qquad \text{[Mathematical Formula 1]}$$

$$R_{th}=(n_z-n_y) \times d \qquad \text{[Mathematical Formula 2]}$$

where $n_x$ is a refractive index of a direction at which the refractive index is the greatest in the surface direction of the film, $n_y$ is a refractive index of a direction perpendicular to the $n_x$ direction in the surface direction of the film, $n_z$ is a thickness directional refractive index, and d is thickness of the film.

* * * * *